(12) United States Patent
Momoh

(10) Patent No.: US 10,948,936 B2
(45) Date of Patent: Mar. 16, 2021

(54) TEST BED PLATFORMS FOR ADVANCED MULTI-STAGE AUTOMATION AND CONTROL FOR SMART AND MICRO GRID

(71) Applicant: James Momoh, Upper Marlboro, MD (US)

(72) Inventor: James Momoh, Upper Marlboro, MD (US)

(73) Assignee: HOWARD UNIVERSITY, Washington, DC (US)

( * ) Notice: Subject to any disclaimer, the term of this patent is extended or adjusted under 35 U.S.C. 154(b) by 341 days.

(21) Appl. No.: 14/946,289

(22) Filed: Nov. 19, 2015

(65) Prior Publication Data

US 2016/0147244 A1 May 26, 2016

Related U.S. Application Data

(60) Provisional application No. 62/082,708, filed on Nov. 21, 2014.

(51) Int. Cl.
*G05F 1/66* (2006.01)
*H02J 3/38* (2006.01)
*H02J 3/00* (2006.01)

(52) U.S. Cl.
CPC ............... *G05F 1/66* (2013.01); *H02J 3/381* (2013.01); *H02J 2003/007* (2013.01)

(58) Field of Classification Search
CPC ........ G05B 15/02; G05F 1/66; G06F 17/5009
USPC ........................................ 700/297, 295, 286
See application file for complete search history.

(56) References Cited

U.S. PATENT DOCUMENTS

| | | | | |
|---|---|---|---|---|
| 8,825,218 B2 * | 9/2014 | Cherian | ................... | H02J 3/00 700/291 |
| 8,862,279 B2 * | 10/2014 | Darden, II | ........... | G06Q 10/063 700/291 |
| 9,300,137 B2 * | 3/2016 | Cherian | ................... | H02J 3/00 |
| 9,515,491 B2 * | 12/2016 | Bhageria | ................... | H02J 4/00 |
| 9,639,103 B2 * | 5/2017 | Darden, II | ................ | G05F 1/66 |
| 9,804,623 B2 * | 10/2017 | Ansari | ....................... | G05F 1/66 |
| 2011/0082597 A1 * | 4/2011 | Meagher | ................... | H02J 3/38 700/291 |
| 2012/0029720 A1 * | 2/2012 | Cherian | .................. | H02J 13/00 700/297 |
| 2015/0100172 A1 * | 4/2015 | Forbes, Jr. | ................ | H02J 3/32 700/295 |
| 2015/0261240 A1 * | 9/2015 | Mokhtari | .................. | G05F 1/66 700/291 |
| 2017/0329290 A1 * | 11/2017 | Kopp | ............... | G06Q 10/06312 |

* cited by examiner

*Primary Examiner* — Bo Fan
(74) *Attorney, Agent, or Firm* — Sughrue Mion, PLLC

(57) ABSTRACT

An apparatus, the apparatus includes a simulator, an interface, and a microgrid. The simulator includes a model of a physical electrical network. The interface is coupled to the simulator. The microgrid is coupled to the interface and includes a plurality of electrical elements that represent aspects of the physical electrical network. The simulator receives requests to analyze performance of the physical electrical network, responsively produces signals that are converted to control signals by the interface and applied to the microgrid, the microgrid providing feedback.

11 Claims, 4 Drawing Sheets

TEST BED PLATFORMS FOR ADVANCED MULTI-STAGE AUTOMATION AND CONTROL FOR SMART AND MICRO GRID

CROSS-REFERENCE TO RELATED APPLICATION

This application claims the benefit of U.S. Provisional Patent Application Ser. No. 62/082,708, filed Nov. 21, 2014, entitled TEST BED PLATFORMS FOR ADVANCED MULTI-STAGE AUTOMATION AND CONTROL FOR SMART AND MICRO GRID which is incorporated by reference in its entirety herein.

STATEMENT AS TO FEDERALLY SPONSORED RESEARCH

Some of the work described herein was funded by a grant from the United States Government. The United States Government may, therefore, have certain rights in the invention.

FIELD OF THE INVENTION

This invention relates generally to microgrids and, more particularly, to systems for testing parameters of microgrids.

BACKGROUND OF THE INVENTION

The development of flexible power and energy systems that are secure, resilient to attack, sustainable, and affordable are a national priority. Additionally, it is desirable that such power and energy systems are both affordable from a developmental perspective and environmentally friendly. Federal and state government administrations are currently encouraging universities and other research institutions to develop advanced design, testing, and control platforms for future small and scalable power systems. Ideally, small and scalable power systems will meet increasing local demand which cannot be guaranteed by a conventional, central generation based network. Industries, government, national laboratories, and various agencies are looking for a testing system to test the design of such power systems.

Research projects are currently being performed to create such a testing system by institutions, national laboratories, and universities. Unfortunately, the current research projects do not provide an in-depth study of the robustness of the concept of microgrids in full operation because they are limited in size. These problems have led to dissatisfaction with current systems.

BRIEF DESCRIPTION OF THE DRAWINGS

Embodiments of the invention are illustrated in the figures of the accompanying drawings in which.

Skilled artisans will appreciate that elements in the figures are illustrated for simplicity and clarity. It will further be appreciated that certain actions and/or steps may be described or depicted in a particular order of occurrence while those skilled in the art will understand that such specificity is not actually required. It will also be understood that the terms and expressions used herein have the ordinary meaning accorded to such terms and expressions with respect to their corresponding respective areas of inquiry and study except where specific meaning have otherwise been set forth.

DETAILED DESCRIPTION

Embodiments of the inventive subject matter include a testing system that can advance microgrid research at different transmission and distribution levels and ensure seamless integration and general compatibility of renewable energy resources. For example, the testing system can allow for shared use by universities and other institutions (e.g., governmental agencies, military branches, etc.) to test different microgrid designs and implementations. In some embodiments, the testing system will allow for validating the design framework for reliability, functionality, and security. Second, the testing system can allow for a broader definition of performance metrics for resilience, sustainability, and configurability. Third, the testing system can be used to provide certification for reliability and safety of proposed microgrids. Finally, data (e.g., real time data) collected from the testing system can be used to assess performance of microgrids. These performance assessments can be used, for example, to justify economic and technical benefits of proposed microgrids.

Figure 1:
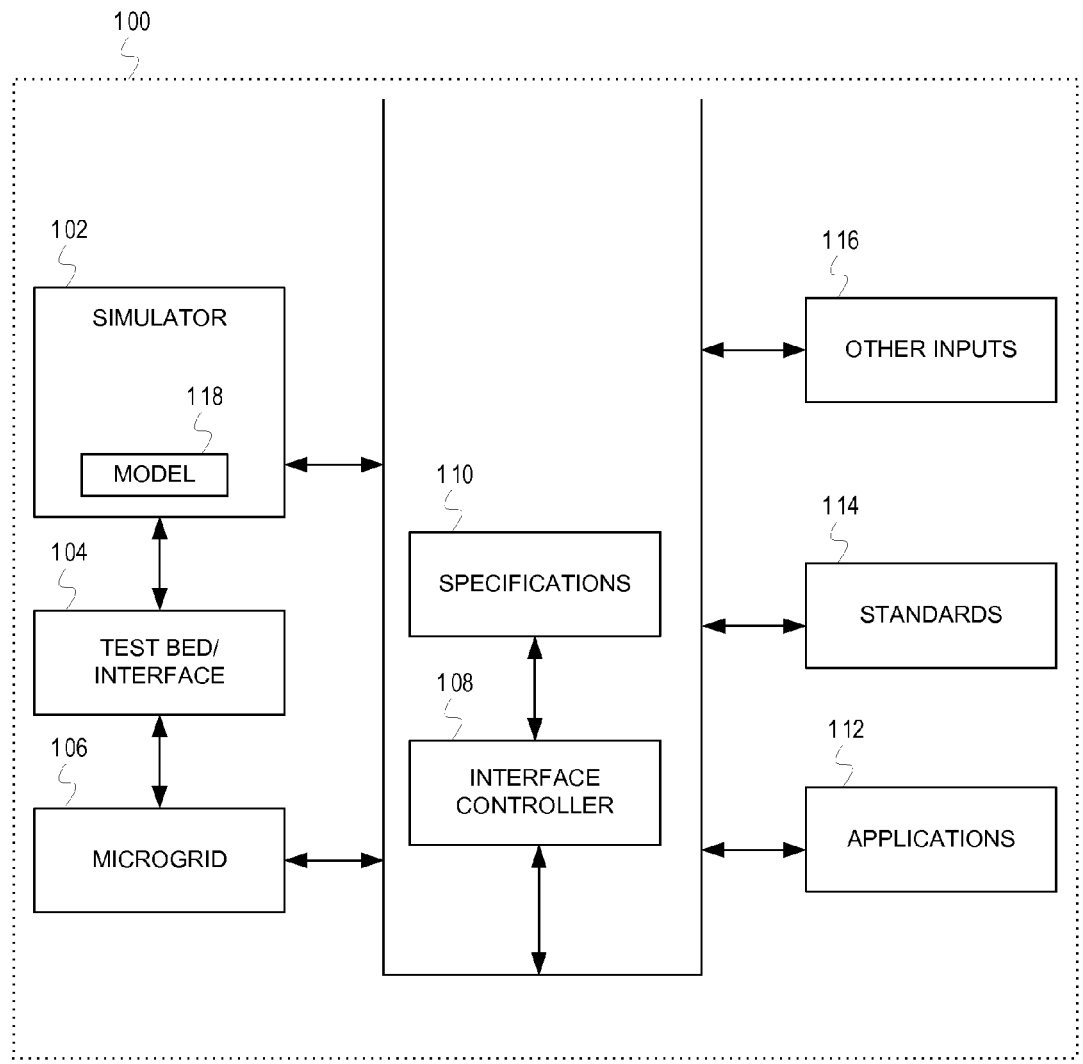
FIG. 1 depicts a system 100 for testing different parameters using a microgrid 106, according to some embodiments of the inventive subject matter.
Figure 1:
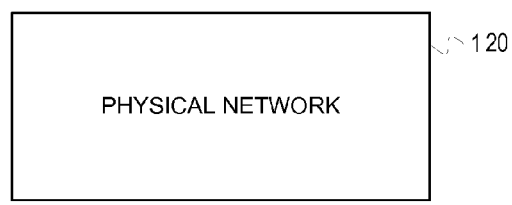

FIG. 1 depicts a system 100 for testing different parameters using a microgrid 106, according to some embodiments of the inventive subject matter. The microgrid 106 can be any relatively small scale network, grid, power infrastructure, etc. For example, the microgrid 106 can be disposed in a single building, group of buildings, factory, campus, portion of a campus, power plant, or any other suitable relatively small scale network. The microgrid can be any combination of grid elements (e.g., routers, servers, generators, batteries, machines of any type, windmills, etc.) and links to physically connect these elements (e.g., transmission lines, control lines, wires, cables, etc.).

The system 100 is an example testing system which can be used to test different parameters of proposed, or currently-in-use microgrids. From a high level, the system 100 includes a simulator 102, an interface 104 (e.g., a Flexible Integrated Phasor System), a microgrid 106 (also referred to as a "microgrid"), and an interface controller 108. Generally, the simulator 102 generates signals and communicates the signals 102 to the interface 104. The interface 104 receives the signals from the simulator 102 and converts the signals for the microgrid 106. After converting the signals to control signals, the interface 104 transmits the control signals to the microgrid 106 for use.

In greater detail, the simulator 102 can model or represent an entity, such as a plant, a factory, a network, etc. In these regards, the simulator can create, store, and modify a model 118 of a target system and/or network (e.g., a plant, factory, university, etc.) to be tested and/or analyzed. In other words, the target system is a real, physical system represented by the model 118. For example, the model 118 can be based on operating parameters for a hypothetical or real network that supplies power to a factory. The target system and/or network is represented as a physical network 120 in FIG. 1. The simulator 102 is flexible so that it can vary these operating parameters of the model 118 to test different scenarios, configurations, etc. for the target system or network. For example, the simulator 102 can vary the operating parameters to test the addition, or removal, of power supply hardware (e.g., capacitors, resistors, inductors, generators, batteries, etc.) and equipment (e.g., additional machines, robots, etc.) from the model 118. These changes can be physically made to the microgrid 106 and then feedback received from the microgrid 106. Additionally, the simulator 102 can vary operating parameters to test changes in power supplied, algorithms used by hardware and equipment within the factory, etc. Essentially, the simulator 102 models hypothetical changes to the physical network 120 by varying operating parameters of the microgrid 106. The model 118 can be implemented, for example, as any combination of computer hardware and/or software. For example, the model 118 can be stored in a computer memory.

In some embodiments, the simulator 102 receives specifications 110 (e.g., operating parameters or other information for the model 118) from an interface controller 108. The interface controller 108 controls access to, and provides security for, the simulator 102. Although FIG. 1 depicts the simulator 102 and the interface controller 108 as physically separate devices, such design is not necessary. For example, in some embodiments, the interface controller 108 can be hardware and/or software resident on the simulator 102. Regardless of design, the interface controller 108 can be communicatively coupled to a communications network and receive specifications 110 that are local to the simulator 102 and/or are remote from the simulator 102. For example, the simulator 102, interface 104, and microgrid 106 can be located at a university and in close proximity to the microgrid 106. The simulator 102 can receive specifications 110 from network devices local to the university and/or receive specifications 110 from remote devices located, for example, at a different university, a government laboratory, etc. In such embodiments, the simulator 102 is connected to a wide area network and can perform test simulations for all authorized parties, regardless of location. Various applications can be utilized by a user to send specifications 110 to the simulator 102. For example, the simulator 102 can also receive information from, and provide information to, other inputs 116 (e.g., local control devices, signal processors, etc.), standards 114 (e.g., cyber security standards for interconnecting system certification cyber attack analysis, cyber attack analysis, component certification against defined performance metrics, safety and/or resilience certification, etc.), and applications 112 (e.g., stability assessments, real-time optimal power flow, vulnerability studies, risk assessments, power systems automation analysis, distribution automation functions, state estimation, asset management, power quality evaluation, cost benefit analysis, etc.). The specifications 110 may ask the simulator 102 to vary a component value of the microgrid 106 to determine the effect of such a change. The simulator 102 receives the change and applies it to the model 118. The change to the model 118 creates a control signal that the interface 106 sends to the microgrid 106. The microgrid 106 provides feedback, which is sent back to the simulator 102. In some embodiments, the simulator 102 can make recommendations based on such feedback. Although depicted in FIG. 1 as communicating directly with the simulator 102, in some embodiments, the other inputs 116, standards 114, and applications 112 communicate with the simulator 102 via the interface controller 108.

The simulator 102 generates signals based on the model 118 of the physical network 120 and the signals are used to vary actual physical devices, parameters, and/or characteristics of the micronetwork 106. For example, the simulator 102 can generate signals that reflect input received from the interface controller 108. The signals can specify operating parameters to be varied. The simulator 102 can include any suitable hardware and/or software for modeling an entity and generating signals based on this modeling. After generating the signals, the simulator 102 communicates the signals to the interface 104.

The interface 104 acts as an interface between the simulator 102 and the microgrid 106. The interface 104 can include any hardware and/or software suitable to allow communication between the simulator 102 and the microgrid 106. In some embodiments, the interface 106 converts the signals generated by the simulator 102 to control signals that are usable by the microgrid 106. In one embodiment, the simulator 102 may generate digital signals. In such an embodiment, the interface 104 can convert the digital signals into control signals for the microgrid 106. Additionally, in some embodiments, the converting can include a mapping (e.g., via a database) of the received signals to control signals to be applied to the microgrid 106. After converting the signals to the control signals, the interface 104 communicates the control signals to the microgrid 106. In some embodiments, the interface 104 can map the signals received from the interface 104 to physical systems of the microgrid 106. For example, the interface 104 can transmit a specific control signals intended for a specific hardware device directly to the specific hardware device.

The interface 104 transmits the control signals to the microgrid 106 for use by the microgrid 106. For example, the control signals can cause physical devices in the microgrid 106 to alter operating parameters (e.g., adjust component values, adjust voltages, turn devices on and/or off, change power signals, etc.). In some embodiments, the microgrid 106 (i.e., components of the microgrid 106) can provide feedback signals (e.g., measurements) to the interface 104. For example, the microgrid 106 can provide feedback as to the test simulation performed and/or make recommendations based on, or in response to, the test simulation performed. The microgrid 106 communicates such feedback to the interface 104. The interface 104 converts the feedback to data usable by the simulator 102 and transmits the data to the simulator 102. Because the simulator 102 is connected to a wide area network via the interface controller 108, in some embodiments, remote users can access the data via the interface controller 108.

In some embodiments, the simulator 102 can perform analysis on data communicated from the microgrid 106. For example, the simulator 102 can analyze the data to determine the efficiency of the simulation. In some embodiments, the simulator 102 can make recommendations, in addition to or in lieu of the microgrid 106, based on the analysis performed.

Figure 2:
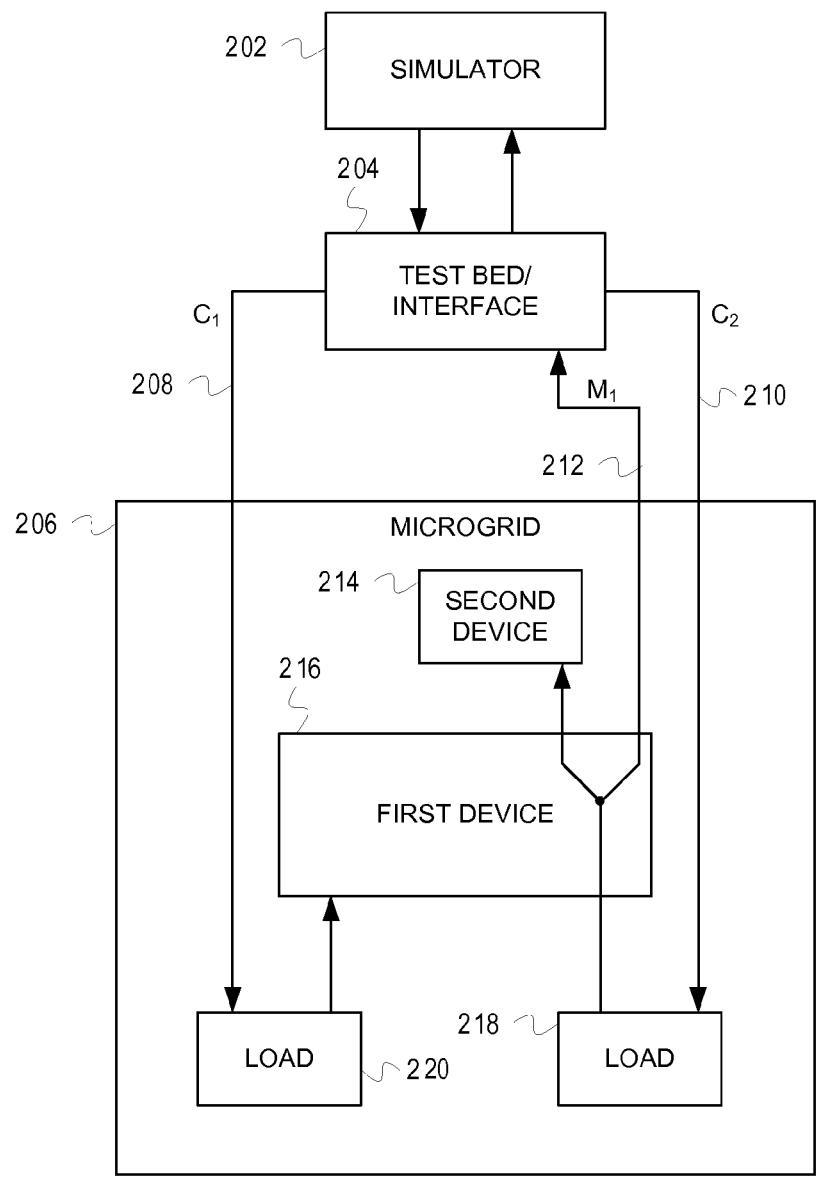
FIG. 2 depicts an interface 104 communicating control signals to a microgrid 106, according to some embodiments of the inventive subject matter.

While FIG. 1 and the related text provide an overview of a system for testing different parameters using a microgrid, FIG. 2 and the related text provide an example test process from the perspective of a microgrid.

FIG. 2 depicts an interface 204 communicating control signals to a microgrid 206, according to some embodiments of the inventive subject matter. The interface 204 receives signals from the simulator 202. The signals indicate operating parameters to be executed by the microgrid 206. The interface 204 converts the signals into control signals. As shown in FIG. 2, the example signal results in two control signals (i.e., a first control signal 208 denoted "$C_1$" and a second control signal 210 denoted "$C_2$"). The first control signal 208 is a control signal for a load 220 to be applied to a first device 216 of the microgrid 206. The second control signal is a control signal for a load 218 to be applied to a second device 216 of the microgrid 206 via the first device 214.

After the microgrid 206 applies the first control signal and the second control signal, the microgrid generates feedback. For example, the microgrid 206 can perform a measurement 212 denoted "$M_1$" and communicate the measurement 212 to the interface 204. The system can be used for, and the feedback can be related to, renewable energy integration, vulnerability study and risk analysis, power system automation analysis, distribution functions evaluation, asset management, power quality evaluation, cost benefit analysis based on real data evaluation, cyber security standard development for interconnecting systems, component and system certification, safety/resilience certification, and real time data for various multidisciplinary research.

Figure 3:
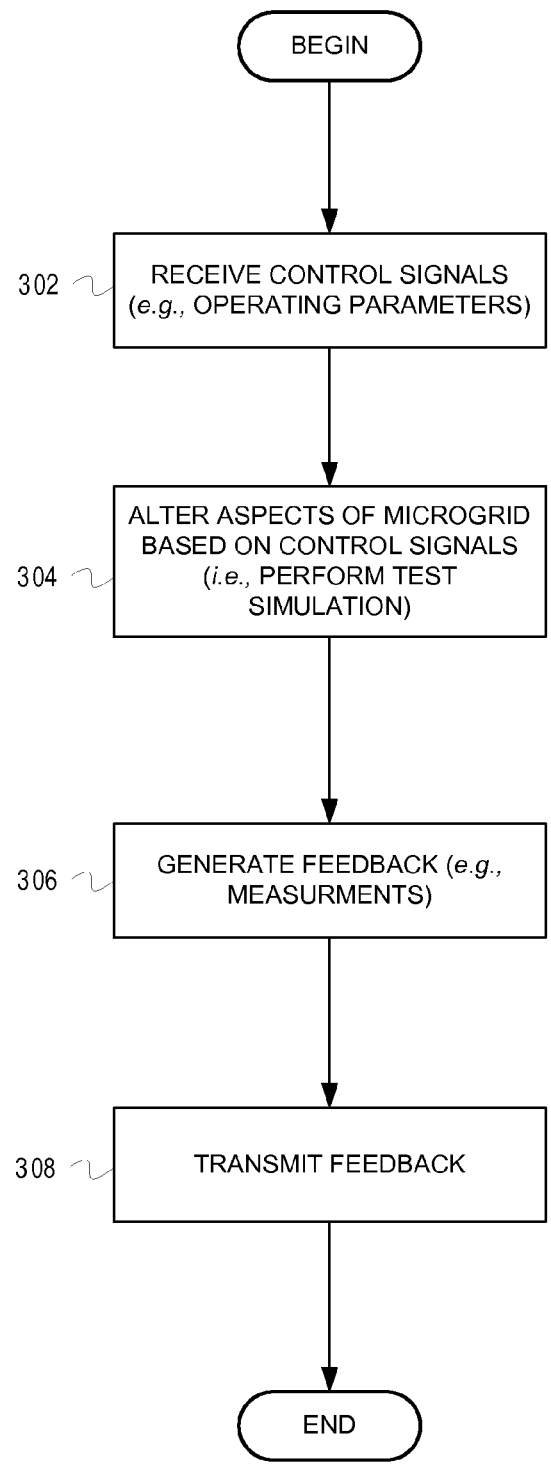
FIG. 3 is a flow chart depicting example operations for performing test simulations via a microgrid, according to some embodiments of the inventive subject matter.
Figure 4:
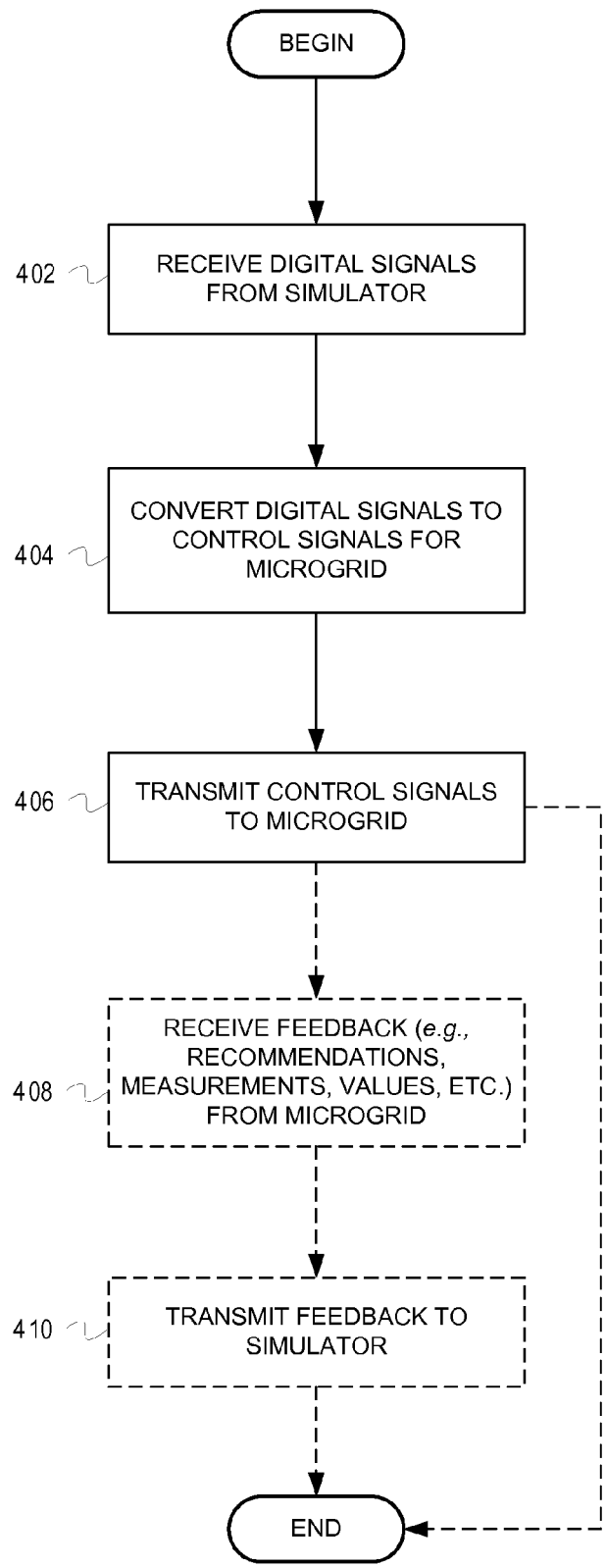
FIG. 4 is a flow chart depicting example operations for receiving signals from a simulator, converting the signals to control signals, and communicating the control signals to a microgrid, according to some embodiments of the inventive subject matter.

While FIG. 2 and the related text provide an example of a test process from the perspective of a microgrid, FIGS. 3 and 4 and the related text provide example operations performed by various components of a testing system.

FIG. 3 is a flow chart depicting example operations for performing test simulations via a microgrid, according to some embodiments of the inventive subject matter. The flow begins at block 302.

At block 302, the microgrid receives control signals for performing a test simulation. Control signals may be instructions, different voltage levels, analog signals, digital signals, etc. that are in a format needed or expected by a physical device. For example, a generator may expect a sinusoidal signal while a controller may expect instructions. The control signals can include operating parameters indicating operating ranges and conditions for different components of the microgrid. In some embodiments, the microgrid receives the control signals from an interface that is coupled to a simulator. In other embodiments, the microgrid can receive the control signals directly from the simulator. Additionally, in some embodiments, the microgrid can receive control signals from other sources. The flow continues at block 304.

At block 304, aspects of the microgrid are altered based on the control signals. That is, the microgrid performs the test simulation. For example, the operating ranges and conditions for one or more components of the microsystem can be varied based on the control signals. The flow continues at block 306.

At bock 306, the microgrid generates feedback based on the test simulation. For example, the microgrid can record, measure, and/or calculate values associated with components of the microgrid during the test simulation. In some embodiments, the microgrid can have one or more components (e.g., controllers) that evaluate the values and make recommendations based on the values. The flow continues at block 308.

At block 308, the microgrid transmits the feedback. In some embodiments, the microgrid transmits the feedback to the interface. In other embodiments, the microcontroller transmits the feedback directly to the simulator.

FIG. 4 is a flow chart depicting example operations for receiving signals from a simulator, converting the signals to control signals, and communicating the control signals to a microgrid, according to some embodiments of the inventive subject matter. The flow begins at block 402.

At block 402, the interface receives signals from the simulator. In some embodiments, the signals indicate operating parameters for one or more components of the microgrid. The signals, though communicated from the simulator, can originate from any device local to, or remote from, the interface. The flow continues at block 404.

At block 404, the interface converts the signals to control signals for the microgrid. In some embodiments, the signals define a test simulation. In such embodiments, the interface converts the signals into specific control signals for one or more components of the microgrid. For example, the signal may indicate that the capacitance for a capacitor in the microgrid be increased. The interface converts this signal into a control signal for the capacitance of the capacitor to be changed. The flow continue at block 406.

At block 406, the interface transmits the control signals to the microgrid. In some embodiments, the flow ends after block 406 (as depicted by the dashed arrow leading to the end). However, in other embodiments, the microgrid generates feedback and transmits the feedback to the interface. In such embodiments, the flow continues at block 408.

At block 408, the interface receives feedback from the microgrid. The feedback can include recommendations, measurements, values, etc. The flow continues at block 410.

At block 410, the interface transmits the feedback to the simulator. As previously discussed, in some embodiments, the simulator can perform analysis on the feedback. After performing the analysis, the simulator can provide recommendations.

It will be appreciated that as described herein a microgrid can be used. The microgrid has its components disposed over a limited geographic area such as a building, a campus, a school, or an office park. However, the microgrid can be placed by a smartgrid having smart control components.

What is claimed is:

1. An apparatus comprising:
a simulator, wherein the simulator is configured to utilize a software model that is representative of a physical power network, wherein the simulator is further configured to receive operating parameters, wherein the operating parameters correspond to components of the physical power network, wherein the simulator is further configured to generate, based on the operating parameters and the model, signals, wherein the operating parameters are received or obtained from a parameter source selected from the group consisting of local control devices, signal processors, standards, and applications;

a microgrid, wherein the microgrid is separate from the physical power network and used for testing simulations for the physical power network, wherein the microgrid includes a plurality of power supply hardware components, and wherein the plurality of power supply hardware components includes one or more of capacitors, resistors, inductors, generators, and batteries;

an interface controller, the interface controller coupled to the simulator, the interface controller configured to control access to, and provide security for, the simulator, the interface controller further configured to receive the operating parameters from the parameter source and forward the operating parameters to the simulator;

an interface, wherein the interface is coupled to the simulator and the microgrid, wherein the interface is configured to receive the signals from the simulator and convert the signals to control signals, wherein the interface is further configured to transmit the control signals to the microgrid;

wherein the microgrid is coupled to the interface and is configured to apply the control signals to at least some of the plurality of power supply hardware components to vary a component value of one or more of the plurality of power supply hardware components and responsively provide feedback to the interface, wherein the varying a component value of one or more of the power supply hardware components includes one or more of adjusting a voltage, turning on one of the power supply hardware components, turning off one of the power supply hardware components, and changing power signals;

wherein the simulator is further configured to receive, from the interface, the feedback, analyze the feedback, and make a recommendation based on the analysis of the feedback.

2. The apparatus of claim 1, wherein the control signals are digital signals.

3. The apparatus of claim 1, wherein the interface is further configured to transmit the feedback to the simulator.

4. The apparatus of claim 1, wherein the microgrid is disposed in one or more of a single building, group of buildings, factory, campus, and portion of a campus.

5. The apparatus of claim 1, wherein the microgrid is disposed between two or more locations.

6. The apparatus of claim 1, wherein the recommendation is based on one or more of an efficiency determination, a vulnerability study, a risk analysis, a power system automation analysis, a distribution functions evaluation, an asset management evaluation, power quality evaluations, a cost benefit analysis, a cyber security standard development, a component and system certification, and a renewable energy integration analysis.

7. An apparatus comprising:
a simulator, wherein the simulator is configured to utilize a software model that is representative of a physical power network, wherein the simulator is further configured to receive operating parameters, wherein the operating parameters correspond to components of the physical power network, wherein the simulator is further configured to generate, based on the operating parameters, signals wherein the operating parameters are received from a parameter source selected from the group consisting of local control devices, signal processors, standards, and applications;

a microgrid, wherein the microgrid includes a first microgrid portion and a second microgrid portion, wherein the first microgrid portion includes a first plurality of power supply hardware components and the second microgrid portion includes a second plurality of power supply hardware components, wherein the first plurality of power supply hardware components and the second plurality of power supply hardware components include one or more of capacitors, resistors, inductors, generators, and batteries, and wherein the first microgrid portion is disposed remotely and separately from the second microgrid portion;

an interface controller, the interface controller coupled to the simulator, the interface controller configured to control access to, and provide security for, the simulator, the interface controller further configured to receive the operating parameters from the parameter source and forward the operating parameters to the simulator; and an interface, wherein the interface is coupled to the simulator, the first microgrid portion, and the second microgrid portion, wherein the interface is configured to receive the signals from the simulator and convert the signals to a first set of control signals and a second set of control signals, wherein the interface is further configured to transmit the first set of control signals to the first microgrid portion and the second set of control signals to the second microgrid portion;

wherein the first microgrid portion is coupled to the interface and configured to apply the first set of control signals to at least some of the first plurality of power supply hardware components to vary a component value of one or more of the first power supply hardware components and responsively provide first feedback to the interface, wherein the varying a component value of one or more of the first power supply hardware components includes one or more of adjusting a voltage, turning on one of the power supply hardware components, turning off one of the power supply hardware components, and changing power signals;

wherein the second microgrid portion is coupled to the interface and configured to apply the second set of control signals to at least some of the second plurality of power supply hardware components to vary a component value of one or more of the second power supply hardware components and responsively provide second feedback to the interface, wherein the varying a component value of one or more of the second power supply hardware components includes one or more of adjusting a voltage, turning on one of the power supply hardware components, turning off one of the power supply hardware components, and changing power signals;

wherein the simulator is further configured to receive, from the interface, the first feedback and the second feedback, analyze the first feedback and the second feedback, and make a recommendation based, at least in part, on the analysis of the first feedback and the second feedback wherein the first microgrid portion and the second microgrid portion are separate from the physical power network and used for testing simulations for the physical power network.

8. The apparatus of claim 7, wherein the first microgrid portion is located in a first building and the second microgrid portion is located in a second building.

9. The apparatus of claim 7, wherein the first microgrid portion is located on a first campus and the second microgrid portion is located on a second campus.

10. The apparatus of claim 7, wherein at least one of the first microgrid portion and the second microgrid portion is located at a university.

11. The apparatus of claim 7, wherein the recommendation is based on one or more of an efficiency determination, a vulnerability study, a risk analysis, a power system automation analysis, a distribution functions evaluation, an asset management evaluation, power quality evaluations, a cost benefit analysis, a cyber security standard development, a component and system certification, and a renewable energy integration analysis.

* * * * *